United States Patent
Wakasugi et al.

(10) Patent No.: US 8,021,785 B2
(45) Date of Patent: Sep. 20, 2011

(54) CATHODE ACTIVE MATERIAL FOR NON-AQUEOUS ELECTROLYTE SECONDARY BATTERY AND ITS PRODUCTION METHOD

(75) Inventors: Yukimitsu Wakasugi, Chigasaki (JP); Takeshi Kawasato, Chigasaki (JP); Yukiko Amagasaki, Chigasaki (JP); Nozomi Honda, Chigasaki (JP)

(73) Assignee: AGC Seimi Chemical Co., Ltd., Chigasaki-shi (JP)

( * ) Notice: Subject to any disclaimer, the term of this patent is extended or adjusted under 35 U.S.C. 154(b) by 668 days.

(21) Appl. No.: 12/100,567

(22) Filed: Apr. 10, 2008

(65) Prior Publication Data

US 2008/0248391 A1 Oct. 9, 2008

Related U.S. Application Data

(63) Continuation of application No. PCT/JP2007/061485, filed on Jun. 6, 2007.

(30) Foreign Application Priority Data

Jun. 9, 2006 (JP) ................................. 2006-161390

(51) Int. Cl.
*H01M 4/48* (2010.01)
(52) U.S. Cl. .................. 429/231.1; 429/231.3; 429/223; 429/224; 429/231.6; 429/218.1; 427/58; 427/123; 427/126.1; 252/182.1
(58) Field of Classification Search ............... 429/231.1, 429/231.3, 223, 224, 231.6, 218.1; 427/58, 427/123, 126.1; 252/182.1
See application file for complete search history.

(56) References Cited

U.S. PATENT DOCUMENTS

| | | | |
|---|---|---|---|
| 7,381,498 B2 | 6/2008 | Suhara et al. | |
| 2005/0220700 A1 | 10/2005 | Suhara et al. | |
| 2007/0099087 A1 | 5/2007 | Mihara et al. | |

FOREIGN PATENT DOCUMENTS

| | | |
|---|---|---|
| JP | 9-237631 | 9/1997 |
| JP | 2001-143708 | 5/2001 |
| JP | 2001-196063 | 7/2001 |
| JP | 2003-17055 | 1/2003 |
| JP | 2003-151548 | 5/2003 |
| JP | 2003-331841 | 11/2003 |
| JP | 2005-19063 | 1/2005 |
| JP | 2005-310744 | 11/2005 |
| JP | 2005-322616 | * 11/2005 |
| JP | 2005-346956 | 12/2005 |

OTHER PUBLICATIONS

U.S. Appl. No. 12/047,481, filed Mar. 13, 2008, Jitsugiri, et al.

* cited by examiner

*Primary Examiner* — Laura Weiner
(74) *Attorney, Agent, or Firm* — Oblon, Spivak, McClelland, Maier & Neustadt, L.L.P.

(57) ABSTRACT

Provided are a cathode active material with high safety, with high discharge capacity even at high operating voltage, and with excellent cyclic charge and discharge properties, its production method and a non-aqueous electrolyte secondary battery containing the cathode active material.

The cathode active material for a non-aqueous electrolyte secondary battery comprises a surface-modified lithium-containing composite oxide particle, wherein the particle is a lithium-containing composite oxide particle represented by the general formula $Li_pN_xO_2$ (wherein $N=Ni_yM_{1-y-z}L_z$, M contains at least one element selected from Co and Mn, L is an element selected from alkaline earth metal elements, aluminum and transition metal elements other than Ni, Co and Mn, $0.9 \leq p \leq 1.1$, $0.9 \leq x < 1.1$, $0.2 \leq y \leq 0.9$, and $0 \leq z \leq 0.3$), and a surface layer of the particle contains aluminum, said surface layer within 5 nm having an aluminum content of at least 0.8 as an atomic ratio to a total of Ni and the element M.

12 Claims, 2 Drawing Sheets

US 8,021,785 B2

CATHODE ACTIVE MATERIAL FOR NON-AQUEOUS ELECTROLYTE SECONDARY BATTERY AND ITS PRODUCTION METHOD

TECHNICAL FIELD

The present invention relates to a cathode active material for a non-aqueous electrolyte secondary battery such as a lithium ion secondary battery, its production method and a lithium secondary battery containing the cathode active material.

BACKGROUND ART

Recently, along with rapid development of information-related equipments and communications equipments such as personal computers and mobile phones, a demand for a non-aqueous electrolyte secondary battery such as a lithium secondary battery which is small in size and light in weight and which has a high energy density, has been high. As a cathode active material for the non-aqueous electrolyte secondary battery, a composite oxide of lithium and a transition metal, such as $LiCoO_2$ $LiNiO_2$ $LiNi_{0.8}Co_{0.2}O_2$ and $LiMn_2O_4$ has been known Among others, the lithium secondary battery using the lithium cobalt composite oxide ($LiCoO_2$) as the cathode active material and using a lithium alloy or carbon such as graphite or carbon fiber as a negative electrode, provides a high voltage at a level of 4 V, and is thus widely being used, particularly, as a battery having a high energy density. However, there is a problem that a raw material compound as a cobalt source for the lithium cobalt composite oxide is rare and expensive.

On the other hand, the lithium nickel composite oxide ($LiNiO_2$) using relatively inexpensive nickel provides a high capacity, but has a problem that its thermal stability is low and the safety in use as a battery is lower than that in use of the lithium cobalt composite oxide ($LiCoO_2$). Furthermore, the lithium manganese composite oxide ($LiMn_2O_4$) with a spinel structure using inexpensive manganese provides high thermal stability and high safety in use as a battery, but has a problem that its capacity is low.

Under such circumstances, attention is attracted to cathode active materials such as lithium nickel manganese (Li—Ni—Mn) composite oxide, lithium nickel cobalt (Li—Ni—Co) composite oxide and lithium nickel manganese cobalt (Li—Ni—Mn—Co) composite oxide which make up for the drawbacks in single use of cobalt, nickel or manganese element and have the advantages. However, none of these cathode active materials containing at least two transition metal elements succeeded in satisfying all the properties including the discharge capacity, the cyclic charge and discharge properties relating to reduction of the discharge capacity caused by repetitive charge and discharge cycles, a rate property relating to a capacitance available for discharge in a short period of time, and the thermal stability in heating durations after charging (which will also be referred to simply as "safety" in the present specification).

Techniques below are known for solving these problems. For example, a proposed compound is an Li—Ni—Mn—Co—Al composite oxide obtained by mixing a lithium compound, a nickel compound, a cobalt compound and a manganese compound, and further adding an aluminum compound and by firing the mixture (cf. Patent Document 1 and Patent Document 2).

Another proposed compound is a cathode active material, a particle surface of which is coated with aluminum, obtained by dispersing and stirring $LiMn_{0.4}Ni_{0.4}Co_{0.2}O_2$ or $Li_{1.1}Mn_{0.31}Ni_{0.38}Co_{0.31}O_2$ synthesized by a solid-phase method, in an isopropyl alcohol solution of $Al(OC_3H_7)_3$ and thermally treating the mixture at 600° C. Still another proposed compound is a cathode active material, a particle surface of which is coated with aluminum, obtained by dispersing and stirring $Li_{1.05}Mn_{0.3}Ni_{0.7}O_2$ in an aqueous solution of $Al(CH_3COCHCOCH_3)_3$ and thermally treating the mixture at 500° C. (cf. Patent Document 3).

Furthermore, the following lithium-containing composite oxide is proposed: first, a co-precipitated composite hydroxide containing nickel and cobalt, or nickel, cobalt and manganese is mixed with lithium hydroxide monohydrate, and the mixture is fired to synthesize a lithium-containing composite oxide with a composition of $Li_{1.08}Ni_{0.7}Co_{0.3}O_2$ or $Li_{1.08}Ni_{0.34}Co_{0.33}Mn_{0.33}O_2$. The lithium-containing composite oxide and powdery aluminum metal are added in water to obtain a slurry, and the slurry is further stirred to dissolve the aluminum metal, and then dried at 80° C., thereby obtaining a lithium-containing composite oxide, a surface of which is covered with a layer containing aluminum hydroxide, aluminum oxide and lithium carbonate (cf. Patent Document 4).

The following composite oxide is also proposed: lithium carbonate, manganese dioxide, nickel oxide and cobalt oxide are mixed and fired to synthesize a lithium-containing composite oxide with a composition of any one of $LiMn_{0.4}Ni_{0.4}Co_{0.2}O_2$ $Li_{1.1}Mn_{0.3}Ni_{0.6}Co_{0.1}O_2$ and $Li_{1.1}Mn_{0.25}Ni_{0.45}Co_{0.3}O_2$. Then aluminum stearate is added to the synthesized lithium-containing composite oxide, and the mixture is mixed and crushed with a ball mill and subjected to a heat treatment at 600° C., thereby obtaining a lithium-containing composite oxide, a particle surface of which is modified with an aluminum compound (cf. Patent Document 5).

Patent Document 1: JP-A-9-237631
Patent Document 2: JP-A-2003-151548
Patent Document 3: JP-A-2005-310744
Patent Document 4: JP-A-2005-322616
Patent Document 5: JP-A-2005-346956

DISCLOSURE OF THE INVENTION

Object to be Accomplished by the Invention

When the above-mentioned lithium-containing composite oxide powders obtained in Patent Documents 1 to 5 were used as the cathode active material for the non-aqueous electrolyte secondary battery such as the lithium secondary battery, the discharge capacity and the cyclic charge and discharge properties were insufficient among the above various properties, and the batteries failed to satisfy the property such as safety sufficiently and simultaneously, so that further improvement was demanded.

On the other hand, in the case where the negative electrode is lithium in the lithium secondary battery, the charging voltage is ordinarily 4.3 V but it is desired to further improve the discharge capacity, by increasing a rate of the cathode active material to be utilized by using a higher charging voltage. For example, in the case where the charging voltage is 4.3 V, a utilization percentage of the cathode active material is from 50 to 60%; whereas, in the case where the charging voltage is 4.5 V, the utilization percentage can be increased to about 70%, so as to dramatically improve the discharge capacity. However, the above lithium-containing composite oxides obtained in Patent Documents 1 to 5 show insufficient cyclic charge and discharge properties even at the charging voltage of 4.3 V and the cyclic charge and discharge properties further degrade at such a high operating voltage as the charging voltage of 4.5 V.

It is an object of the present invention to provide a cathode active material for a non-aqueous electrolyte secondary battery, which has high safety, and a high discharge capacity and excellent cyclic charge and discharge properties, even at a high operating voltage, its production method and a non-aqueous electrolyte secondary battery such as the lithium secondary battery containing the cathode active material.

Means to Accomplish the Object

The present inventors have conducted extensive studies and found that the above-mentioned object was accomplished by a cathode active material comprising surface-modified lithium-containing composite oxide particles which were lithium-containing composite oxide particles with a specific composition and in a specific surface region of which aluminum was contained in a relatively high specific concentration. Namely, it was found that use of such a cathode achieved the high safety, a high discharge capacity even at a high operating voltage, and excellent cyclic charge and discharge properties.

The mechanism as to why such excellent properties are accomplished by the above lithium-containing composite oxide particles is not necessarily clearly understood, but is considered as follows. Namely, when charge and discharge are repeated with the non-aqueous electrolyte secondary battery such as the lithium secondary battery, decomposition of the electrolyte occurs at the interface between the lithium-containing composite oxide particles and the electrolyte to generate a gas containing carbon dioxide. It is considered, however, that in the case of using the surface-modified lithium-containing composite oxide particles containing aluminum in a relatively high concentration in the surface region, aluminum reacts with active sites on the surface of the lithium-containing composite oxide particles, to suppress the above-mentioned decomposition of the electrolyte, whereby the high operating voltage, high volume capacity density and high safety are maintained. In addition, it is considered that if aluminum exists in a relatively high concentration in the surface layer of the lithium-containing composite oxide particles, it suppresses elution of an active component in the lithium-containing composite oxide particles into the electrolyte, whereby the charge and discharge cyclic properties are considerably improved not only at the operating voltage of 4.3 V but also at a particularly high operating voltage of 4.5 V.

On the other hand, the above-mentioned conventional lithium-containing composite oxide particles contain aluminum but the aluminum content is not large and particularly the aluminum content in the surface layer thereof is not large. For example, the above-mentioned lithium-containing composite oxide powders described in Patent Documents 1 and 2 contain aluminum in a substantially uniform concentration over the entire region, but the atomic ratio of aluminum to a total of Ni and element M in the surface layer within 5 nm of the powder is at most about 0.7 in each case because the powder is fired at a high temperature after addition of aluminum. It is noted that the element M refers to cobalt, manganese or an element containing both of them, contained in the lithium-containing composite oxide particles.

Furthermore, in Patent Document 3, the surface of the lithium-containing composite oxide powder is treated with a suspension or solution containing aluminum, to impregnate aluminum, but the atomic ratio of aluminum to the total of Ni and the element M in the surface layer within 5 nm of the particles was at most about 0.7 because of an extremely small amount of aluminum added and a high temperature treatment.

In Patent Document 4, the surface layer of the lithium-containing composite oxide contains not only aluminum hydroxide and aluminum oxide but also lithium carbonate, and therefore, the atomic ratio of aluminum to the total of Ni and the element M in the surface layer within 5 nm of the lithium-containing composite oxide tends to be lower and the atomic ratio thereof is at most about 0.7.

Furthermore, in Patent Document 5, the lithium-containing composite oxide powder and the aluminum compound are mixed with a ball mill and then subjected to a heat treatment at a high temperature, but the atomic ratio of aluminum in the surface layer within 5 nm of the powder obtained by the above mixing method is at most about 0.7 to the total of Ni and the element M.

As described above, the present invention is based on the above-mentioned novel finding and has the following gists.

(1) A cathode active material for a non-aqueous electrolyte secondary battery, comprising a surface-modified lithium-containing composite oxide particle, wherein the particle is a lithium-containing composite oxide particle represented by the general formula $Li_pN_xO_2$ (wherein $N=Ni_yM_{1-y-z}L_z$ M contains at least one element selected from Co and Mn, L is an element selected from alkaline earth metal elements, aluminum and transition metal elements other than Ni, Co and Mn, $0.9 \leq p \leq 1.1$, $0.9 > x > 1.1$, $0.2 \leq y \leq 0.9$, and $0 > z > 0.3$), and a surface layer of the particle contains aluminum, said surface layer within 5 nm having an aluminum content of at least 0.8 as an atomic ratio to a total of Ni and the element M.

(2) The cathode active material for a non-aqueous electrolyte secondary battery according to the above (1), wherein the lithium-containing composite oxide particle is a particle of at least one member selected from the group consisting of lithium nickel cobalt oxide, lithium nickel manganese oxide and lithium nickel cobalt manganese oxide, and wherein the whole lithium-containing composite oxide particle contains aluminum in an atomic ratio of from 0.0005 to 0.20 to the element N.

(3) The cathode active material for a non-aqueous electrolyte secondary battery according to the above (1) or (2), wherein the surface-modified lithium-containing composite oxide particle has an average particle size (D50) of from 5 to 25 μm.

(4) The cathode active material for a non-aqueous electrolyte secondary battery according to any one of the above (1) to (3), wherein the surface-modified lithium-containing composite oxide particle contains a carbon compound in the surface layer thereof.

(5) The cathode active material for a non-aqueous electrolyte secondary battery according to the above (4), wherein the carbon compound is a partial pyrolysate of a carbon-containing aluminum complex.

(6) A lithium secondary battery comprising a positive electrode, a negative electrode and a non-aqueous electrolyte, wherein the cathode active material as defined in any one of the above (1) to (5) is used for the positive electrode.

(7) A process for producing a particle of the cathode active material for a non-aqueous electrolyte secondary battery as defined in any one of the above (1) to (5), the process comprising step 1 of impregnating an aluminum complex-containing aqueous solution at a pH of from 3 to 12 into a lithium-containing composite oxide particle represented by the general formula $Li_pN_xO_2$ (wherein $N=Ni_yM_{1-y-x}L_z$ M contains at least one element selected from Co and Mn, L is an element selected from alkaline earth metal elements, aluminum and transition metal elements other than Ni, Co and Mn, $0.9 \leq p \leq 1.1$, $0.9 \leq x < 1.1$, $0.2 \leq y \leq 0.9$, and $0 \leq z \leq 0.3$), and mixing and drying the particle to prepare an aluminum complex-impregnated particle, and step 2 of subjecting the aluminum complex-impregnated particle prepared in the step 1, to a heat treatment in an oxygen-containing atmosphere.

(8) The process according to the above (7), wherein the heat treatment in the step 2 is carried out at from 200 to 450° C.

(9) The process according to the above (7) or (8), wherein the aluminum complex is a carbon-containing aluminum complex.

(10) The process according to the above (9), wherein the carbon-containing aluminum complex is basic aluminum lactate.

(11) The process for producing the cathode active material for a non-aqueous electrolyte secondary battery according to any one of the above (7) to (10), wherein a drum mixer is used in either of impregnating and, mixing and drying in the step 1 for preparing the aluminum complex-impregnated particle.

Effects of the Invention

According to the present invention, it is possible to provide a cathode active material for a non-aqueous electrolyte secondary battery comprising a surface-modified lithium-containing composite oxide particle with a high operating voltage, a high discharge capacity and excellent cyclic charge and discharge properties, without reduction in safety, a process for producing the cathode active material and a non-aqueous electrolyte secondary battery utilizing the cathode active material.

MEANS OF SYMBOLS

Figure 1:
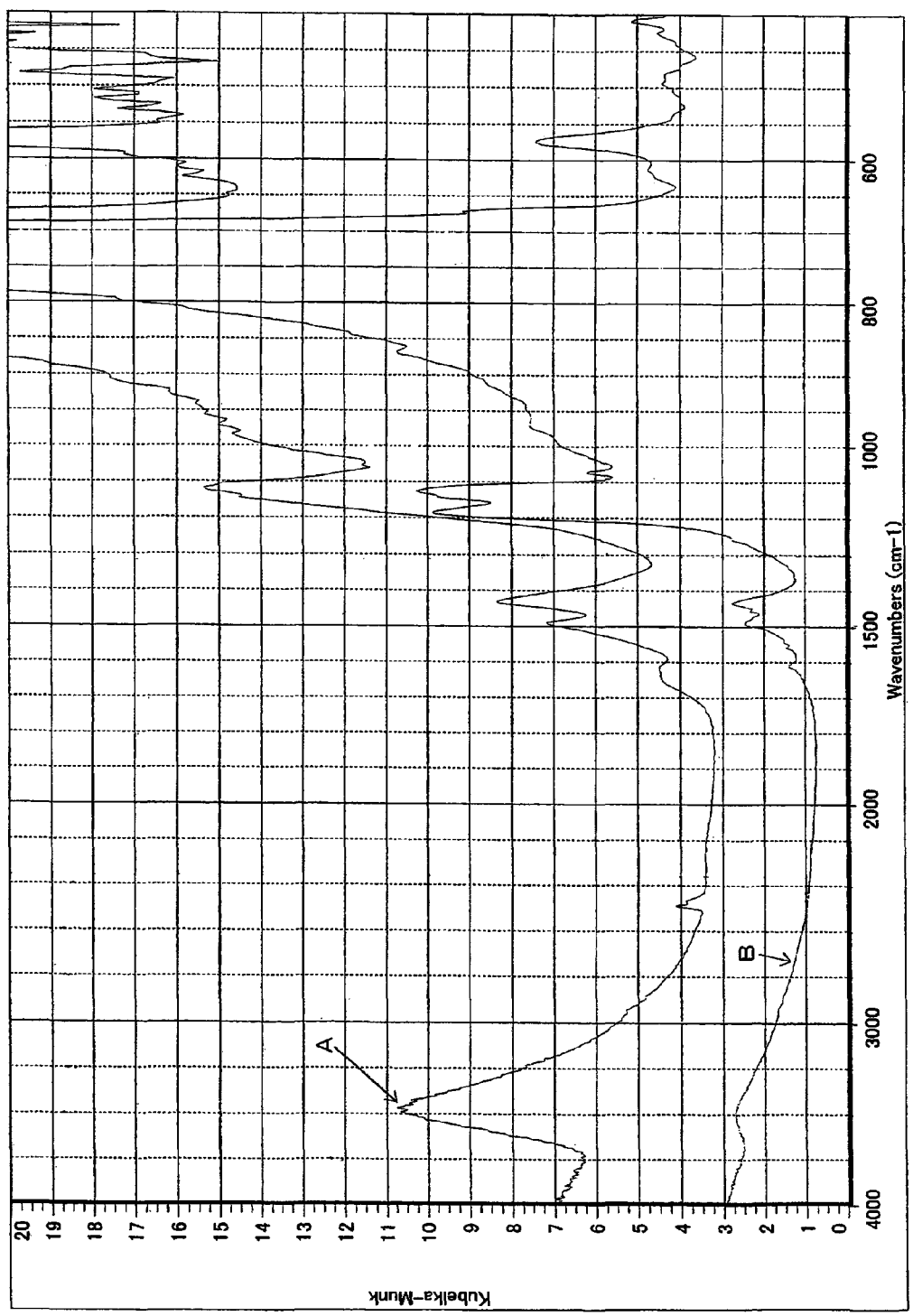
FIG. 1 shows infrared absorption (IR) spectra of a surface-modified lithium-containing composite oxide synthesized in Example 2 and a lithium-containing composite oxide synthesized in Example 4.

A: Spectrum of surface-modified lithium-containing composite oxide obtained in Example 2

B: Spectrum of lithium-containing composite oxide obtained in Example 4

BEST MODE FOR CARRYING OUT THE INVENTION

The surface-modified lithium-containing composite oxide particle of the present invention is obtained by modifying the surface of the lithium-containing composite oxide particle as a base material with an aluminum compound. The lithium-containing composite oxide particle as the base material is represented by the general formula $Li_p N_x O_2$ (wherein $N = Ni_y M_{1-y-z} L_z$ M contains at least one element selected from Co and Mn, L is an element selected from alkaline earth metal elements, aluminum and transition metal elements other than Ni, Co and Mn, $0.9 \leq p \leq 1.1$, $0.9 \leq x \leq 1.1$, $0.2 \leq y \leq 0.9$, and $0 \leq z \leq 0.3$). In the formula, the element M is an element containing at least one selected from Co and Mn. Among them, the element M is preferably cobalt-manganese from the viewpoint of practical use.

Furthermore, with respect to p and x in the formula, $0.9 \leq p \leq 1.1$, preferably $0.95 \leq p \leq 1.05$; $0.9 \leq x \leq 1.1$, preferably $0.95 \leq x \leq 1.05$. When the element M contains either one of Co and Mn, it is preferred that $0.50 \leq y \leq 0.85$. When the element M contains Co and Mn, it is preferred that $0.30 \leq y \leq 0.70$. Furthermore, it is possible to further improve the battery properties by addition of the element L. When the element L contains an alkaline earth metal element or aluminum, z is preferably in a range of $0 \leq z \leq 0.1$. If an element such as aluminum excessively exists inside of the lithium-containing composite oxide particle, the discharge capacity might decrease. The element L represents the above-described elements, among which a bivalent to tetravalent elements such as Al, Mg, Zr, Ti, Mo and Ca are preferably selected. The element L is particularly preferably Al, Zr or Ti. In such a case, specific examples of the lithium-containing composite oxide include $LiNi_{0.8}Co_{0.15}Al_{0.05}O_2$ $LiNi_{0.6}Co_{0.1}Mn_{0.25}Al_{0.05}O_2$, $LiNi_{1/3}Co_{1/3}Mn_{1/3}O_2$ $LiNi_{0.8}Co_{0.2}O_2$ $LiNi_{0.4}Mn_{0.4}Co_{0.2}O_2$, $Li_{1.02}$ $[(Ni_{1/3}Co_{1/3}Mn_{1/3})_{0.999}Zr_{0.001}]_{0.98}O_2$, $Li_{1.048}Mn_{0.286}Ni_{0.571}Co_{0.095}O_2$ and so on. Commercially available lithium-containing composite oxide may also be used.

In the surface-modified lithium-containing composite oxide particle of the present invention, the aluminum content in the surface layer within 5 nm from the particle surface is required in an atomic ratio of at least 0.8 to a total of Ni and the element M. The effects of the present invention as described above are accomplished as long as the aluminum content is within the predetermined range. The reason why the aluminum content in the surface layer within 5 nm from the surface of the surface-modified lithium-containing composite oxide particle is important is that aluminum existing near the surface of the surface-modified lithium-containing composite oxide powder is important as described above, and the content of aluminum in the surface layer within 5 nm of the particle can be readily obtained by means of XPS analysis (X-ray photoelectron spectroscopy) as described below.

It is noted that "the atomic ratio of aluminum to the total of Ni and the element M in the surface layer within 5 nm from the surface of the surface-modified lithium-containing composite oxide particle" will also be referred to simply as an "atomic ratio (Al/NiM) in the surface layer of the lithium-containing composite oxide particle" in the present specification.

In the present invention, the atomic ratio (Al/NiM) in the surface of the surface-modified lithium-containing composite oxide particle is at least 0.8, preferably at least 1.0, and more preferably at least 1.2. On the other hand, there is no particular upper limit, but the atomic ratio (Al/NiM) is preferably at most 15, more preferably at most 12, and particularly preferably at most 10.

In the present invention, the atomic ratio (Al/NiM) in the surface of the lithium-containing composite oxide particle is analyzed by the XPS analysis (X-ray photoelectron spectroscopy). The XPS analysis can analyze a kind or abundance ratio of an element contained in a layer extremely near the surface of a particle. An example of the XPS analyzer may be ESCA5400 (non-monochromatic type) manufactured by PHI, Inc. When the atomic ratio (Al/NiM) in the surface of the particle is obtained by the XPS analysis in the present invention, it is preferred to use a peak which can be detected with high sensitivity and does not overlap a peak of another element as much as possible. Precisely, it is preferred to perform the calculation using the 2p peak with high sensitivity in the analysis of aluminum. Furthermore, it is preferable to perform the calculation using the 2p3 peak with high sensitivity in the analysis of cobalt, manganese or nickel.

The EPMA (X-ray micro analyzer) analysis or the EDS (energy dispersive X-ray spectrometry) analysis, which is frequently used for an elemental analysis of a powder surface, is an analysis that obtains information on an element in a relatively deep range from the surface of the powder to the surface layer of from 50 to 100 nm. Therefore, they are unsuitable for measuring the atomic ratio (Al/NiM) in the surface of the lithium-containing composite oxide particle in the present invention.

An amount of aluminum contained in the surface-modified lithium-containing composite oxide particle in the present invention, as the whole particle, is preferably in an atomic ratio of from 0.0005 to 0.20, particularly preferably from 0.001 to 0.15 to the element N. When the element L contained in the element N contains aluminum, the aluminum content in the surface-modified lithium-containing composite oxide is preferably in an atomic ratio of from 0.05 to 0.15 to the element N. When the element L contained in the element N contains no aluminum, the aluminum contained in the whole surface-modified lithium-containing composite oxide particle is more preferably in an atomic ratio of from 0.001 to 0.03 to the element N.

Furthermore, the surface-modified lithium-containing composite oxide particle of the present invention preferably further contains a carbon compound in the surface layer. The carbon compound is preferably a partial pyrolysate of a carbon-containing aluminum complex having a structure of at least a carbon-oxygen double bond. Among others, the above carbon compound is particularly preferably a carbon compound in which the carbon-oxygen double bond is a carbonate group or a carbonyl group. Specific examples of preferred compounds as the carbon compound include partial pyrolysate of aluminum citrate, aluminum tartarate, aluminum oxalate, aluminum malonate, aluminum maleate, aluminum malate, aluminum racemate, aluminum lactate and aluminum glyoxylate. The carbon compound is more preferably the partial pyrolysate of aluminum lactate among them. It is noted that the partial pyrolysate in the present specification means a product that has the carbon-oxygen double bond structure and in that the aluminum complex existing in the surface of the surface-modified lithium-containing composite oxide particle is thermally decomposed in part.

FIG. 1 shows a chart of infrared absorption (IR) spectra of the lithium-containing composite oxides synthesized in Example 2 and Example 4. There is a strong absorption peak in a range of from 1300 to 1700 cm$^{-1}$ in the IR spectrum of the surface-modified lithium-containing composite oxide synthesized in Example 2. The absorption peak is an absorption peak originating from the carbon-oxygen double bond, which indicates that a carbon compound exists in the surface layer. Furthermore, it shows that the carbon compound is a partial pyrolysate of the carbon-containing aluminum complex used as a raw material. On the other hand, there is no strong absorption peak originating from the carbon-oxygen double bond in the IR spectrum of the lithium-containing composite oxide synthesized in Example 4.

Figure 2:
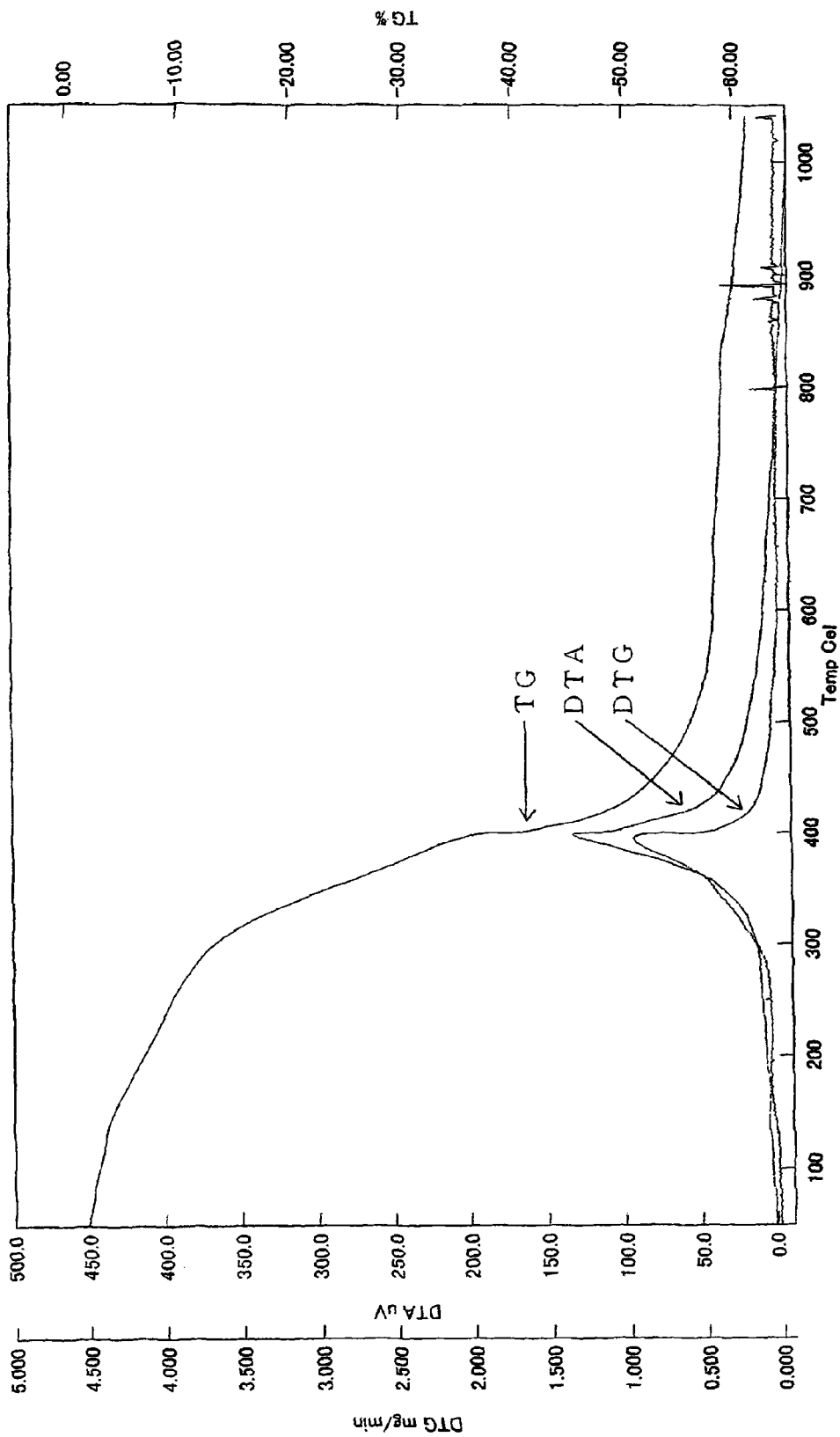
FIG. 2 shows measurement results of thermogravimetric—differential thermal—differential thermogravimetric (TG-DTA-DTG) analyses of dried aluminum lactate.

Furthermore, FIG. 2 shows the measurement results of a change in weight (TG and DTG) and a change in heating value (DTA) with application of heat to a powder (dry powder) obtained by drying aluminum lactate. It is clear from FIG. 2 that as the aluminum lactate dry powder is heated in a range of from 300 to 450° C., the weight of the dry powder abruptly decreases and abrupt exothermic reaction occurs. Namely, it suggests that aluminum lactate should undergo partial pyrolysis to generate a gas such as carbon dioxide, whereby a decarboxylation reaction should proceed in the above temperature range. Furthermore, it is clear from FIG. 2 that the pyrolysis is almost finished in a temperature range of at least 500° C. It suggests that the aluminum complex should be converted to aluminum oxide or aluminum hydroxide in this stage.

It is clear from the foregoing that the aluminum compound with the carbon-oxygen double bond exists in the surface layer of the surface-modified lithium-containing composite oxide particle synthesized by the heat treatment at 350° C. in Example 2, and that the carbon compound exists in the surface layer and the carbon compound is the partial pyrolysate of the carbon-containing aluminum complex used as the raw material. The cyclic charge and discharge properties are further improved by this, but the reason and mechanism as to why the cyclic charge and discharge properties are further improved are not necessarily clearly understood.

The surface-modified lithium-containing composite oxide particle of the present invention can be obtained by impregnating an aqueous solution containing aluminum complex at a pH of from 3 to 12 (which is also referred to as an "Al aqueous solution" in the present specification) into a lithium-containing composite oxide such as $LiNi_{1/3}Co_{1/3}Mn_{1/3}O_2$ preliminarily synthesized, mixing and drying the resultant, and thermally treating it.

There are no particular restrictions on the aluminum compound as the raw material for the Al aqueous solution, but a complex compound of aluminum is preferably used from the viewpoint of improvement in solubility of aluminum existing in the aqueous solution containing the aluminum used for surface modification. It is noted that the complex compound of aluminum means a compound that forms a complex by coordination to aluminum when it is dissolved in water. Furthermore, a carbon-containing aluminum complex is more preferred, a carbon-containing aluminum complex having a carbonyl group or a carbonate group is further preferred and an organic acid aluminum complex having a carbonyl group or a carbonate group is particularly preferred because the above-mentioned carbon compound preferably remains in the surface of the surface-modified lithium-containing composite oxide particle after the heat treatment. Specifically, the aluminum compound is preferably at least one member selected from aluminum citrate, aluminum tartarate, aluminum oxalate, aluminum malonate, aluminum maleate, aluminum malate, aluminum racemate, aluminum lactate and aluminum glyoxylate. The existence of such carbon is preferable because the cyclic charge and discharge properties of a battery using the surface-modified lithium-containing composite oxide tend to be further improved.

In addition, the above-mentioned Al aqueous solution may contain a carboxylic acid. When the Al aqueous solution contains a carboxylic acid, the carboxylic acid is preferably one having a carbon number of from 2 to 8 from the viewpoint of the solubility in the aqueous solution, and above all, it is more preferably citric acid, tartaric acid, oxalic acid, malonic acid, maleic acid, malic acid, racemic acid, lactic acid or glyoxylic acid. A content of the carboxylic acid in the Al aqueous solution is preferably from 0.05 to 30 weight %, particularly preferably from 0.1 to 20 weight %. When the Al aqueous solution contains the carboxylic acid, the water solubility of the aluminum complex contained in the Al aqueous solution tends to improve and the aluminum complex dissolved in the Al aqueous solution further tends to become less likely to precipitate.

The concentration of aluminum in the Al aqueous solution is preferably a high concentration because it is necessary to remove the aqueous medium by drying in a subsequent step.

However, if the aluminum concentration in the aqueous solution is too high, the viscosity becomes so high as to tend to complicate a contact process with the base material or handling of the aqueous solution. Therefore, the aluminum concentration in the Al aqueous solution is preferably from 0.01 to 20 weight % and more preferably from 0.1 to 5 weight %.

In the step of impregnating the Al aqueous solution into the lithium-containing composite oxide particle as the base material, an amount of the Al aqueous solution is adjusted preferably in a range of from 0.1 to 80 weight %, more preferably from 1 to 75 weight % and, among others, particularly preferably from 30 to 70 weight % relative to the base material to be used. When the amount of the Al aqueous solution relative to the base material to be used is within the above range, a problem of variation in the quality of the cathode active material among lots is eliminated and a large amount of cathode active materials tend to be stably produced, in synthesizing a large amount of the cathode active material according to the present invention, such being preferred.

There are no particular restrictions on a means of impregnating the Al aqueous solution into the surface-modified lithium-containing composite oxide particle as the base material, and specific examples thereof include a means for spraying the Al aqueous solution onto the powder particles as the base material to impregnate it, a means for putting the powder particles as the base material in the Al aqueous solution stored in a container, and agitating the mixture to impregnate it, and the like. Specific examples of agitators used for the agitation include a twin screw kneader, an axial mixer, a paddle mixer, a turbulizer, a drum mixer, a Solidair, a Redige mixer, and so on. Among others, the drum mixer is preferred as the agitator. When the drum mixer is used as the agitator, the atomic ratio (Al/NiM) in the particle surface of the surface-modified lithium-containing composite oxide tends to be increased even with a small amount of the aluminum compound used as the raw material for the Al aqueous solution. Namely, it is preferred because the battery properties such as the cyclic charge and discharge properties can be efficiently improved with a small amount of the aluminum compound. Furthermore, a small-size agitator in a level of laboratory size may also be used as the above-mentioned agitator, in addition to the commercially available machines.

In the step of mixing and drying after impregnating the Al aqueous solution into the lithium-containing composite oxide particle as the base material, the drying is carried out preferably at from 50 to 200° C., particularly preferably at from 80 to 140° C., and preferably for from 0.1 to 10 hours. The aqueous medium remaining in the aluminum complex-impregnated particle after drying is not necessarily completely removed at this stage because it will be removed in the subsequent firing step, but it is preferably removed as much as possible because a large quantity of energy will be required to evaporate the water content in the firing step.

Moreover, in the steps of impregnating the Al aqueous solution, and mixing and drying to obtain the aluminum complex-impregnated particle, the impregnating, mixing, and drying may be carried out sequentially and separately, or these processes may be carried out simultaneously with the Redige mixer or the like.

Furthermore, after the aqueous medium is removed from the aluminum complex-impregnated particle as much as possible, the aluminum complex-impregnated particle is subjected to a heat treatment in an oxygen-containing atmosphere preferably at from 200 to 450° C., usually for from 0.1 to 24 hours, thereby obtaining the surface-modified lithium-containing composite oxide of the present invention. In the heat treatment of the above-mentioned impregnated powder, a more preferred temperature range is from 250 to 400° C.

The cathode active material comprising the surface-modified lithium-containing composite oxide particle of the present invention obtained as described above preferably has an average particle size (D50) of from 5 to 25 µm, particularly preferably from 8 to 20 µm, and preferably has a specific surface area of from 0.1 to 1.0 $m^2$/g, particularly preferably from 0.2 to 0.8 $m^2$/g. Furthermore, the half-value width of the diffraction peak of the (110) plane at $2\theta=65.1\pm1°$ measured by the X-ray analysis using CuKα as a radiation source, is preferably from 0.08 to 0.300, particularly preferably from 0.09 to 0.25°. The press density is preferably from 2.40 to 3.50 $g/cm^3$ particularly preferably from 2.50 to 3.30 $g/cm^3$. In the present invention, the press density means an apparent density of the particle when the lithium composite oxide particle is pressed under a pressure of 1.0 $ton/cm^2$. Furthermore, the surface-modified lithium-containing composite oxide of the present invention preferably has an elution amount of lithium ions of at most 0.60 mol %, more preferably from 0.01 to 0.50 mol %, and among others, particularly preferably from 0.01 to 0.40 mol %.

In the present invention, the elution amount of lithium ions is measured as follows. First, 10 g of the cathode active material powder is added to 90 g of water and the aqueous solution thus obtained is stirred for 30 minutes to effect dispersion. Then, the aqueous solution is filtered and the filtrate obtained is titrated with hydrochloric acid, thereby obtaining the elution amount.

In the case where the elution amount of lithium ions is within the above range, when the cathode active material powder is processed to the positive electrode, a slurry obtained by dispersing the cathode active material powder in a dispersion medium such as N-methylpyrrolidone tends to become less likely to gel and the positive electrode processing becomes easier, such being preferred. Furthermore, the cyclic charge and discharge properties tend to improve, such being preferred.

The average particle size in the present invention means a volume-based accumulative 50% size (D50) which is a particle size at a point of 50% on an accumulative curve when the accumulative curve is drawn so that a particle size distribution is obtained on the volume basis and the whole volume is 100%. The particle size distribution is obtained from a frequency distribution and accumulative volume distribution curve measured by means of a laser scattering particle size distribution measuring apparatus. The measurement of particle sizes is conducted by measuring the particle size distribution while the powder is sufficiently dispersed in an aqueous medium by an ultrasonic treatment or the like (for example, using Microtrack HRA(X-100) manufactured by NIKKISO CO., LTD.). It is noted that the above-mentioned average particle size is also referred to as an "average particle size (D50)" in the present specification.

A method for obtaining a positive electrode for the lithium secondary battery with use of the cathode active material of the present invention may be carried out by conventional means. For example, a carbon type electroconductive material such as acetylene black, graphite or Ketjenblack, and a binder, are mixed in the powder of the cathode active material of the present invention, thereby obtaining a cathode mixture. The binder to be used may be polyvinylidene polyfluoride, polytetrafluoroethylene, polyamide, carboxy methyl cellulose, acrylic resin, or the like.

A slurry obtained by dispersing the above cathode mixture in a dispersing medium such as N-methylpyrrolidone is applied onto a cathode current collector such as aluminum foil, dried, and pressed, thereby forming a cathode active material layer on the cathode current collector.

In the lithium secondary battery using the cathode active material of the present invention as the positive electrode, the electrolyte contained in the electrolyte solution or a polymer electrolyte in the battery is preferably at least one member selected from lithium salts, anions of which are, for example, $ClO_4^-$ $CF_3SO_3^-$ $BF_4^-$ $PF_6^-$ $AsF_6^-$ $SbF_6^-$ $CF_3CO_2^-$ and $(CF_3SO_2)_2N^-$. In the above electrolyte solution or polymer electrolyte for the battery, the above electrolyte composed of a lithium salt is preferably contained in a concentration of from 0.2 to 2.0 mol/L in the above solvent or solvent-containing polymer. If the concentration is off this range, ionic conductivity will decrease and the electrical conductivity of the electrolyte will decrease. More preferably, the concentration is from 0.5 to 1.5 mol/L. A separator to be used may preferably be a porous polyethylene or porous polypropylene film.

Furthermore, the solvent for the electrolyte solution to be used is preferably a carbonate ester. Either of a cyclic type and a chain type may be used as the carbonate ester. Examples of the cyclic type carbonate esters include propylene carbonate, ethylene carbonate (EC) and so on. Examples of the chain type carbonate esters include dimethyl carbonate, diethyl carbonate (DEC), ethyl methyl carbonate, methylpropyl carbonate, methyl isopropyl carbonate and so on.

The above carbonate ester may be a single carbonate ester, or a mixture of two or more of them. Furthermore, it may be used as mixed with another solvent. Moreover, depending upon the material of the anode active material, a chain carbonate ester and a cyclic carbonate ester may be used together, which can improve the discharge properties, the charge and discharge cyclic properties, or the charge and discharge efficiency.

It is also possible to use a gel polymer electrolyte obtained by adding a vinylidene fluoride-hexafluoropropylene copolymer (for example, KYNAR manufactured by Atochem Company) or a vinylidene fluoride-perfluoropropyl vinyl ether copolymer in one of these organic solvent and adding the solute as described above.

In the lithium battery using the cathode active material of the present invention as the positive electrode, the anode active material is a material that can occlude and discharge lithium ions. There are no particular limitations on the material forming the anode active material, and examples thereof include lithium metal, a lithium alloy, a carbon material, a carbon compound, a silicon carbide compound, a silicon oxide compound, titanium sulfide, a boron carbide compound, an oxide consisting mainly of a metal of Group 14 or Group 15 in the Periodic Table, and so on.

The carbon material applicable herein is one resulting from pyrolysis of an organic material under various pyrolysis conditions, artificial graphite, natural graphite, soil graphite, exfoliated graphite, flake graphite, or the like. The oxide applicable is a compound consisting mainly of tin oxide. The anode current collector to be used is a copper foil, nickel foil or the like.

There are no particular restrictions on the shape of the lithium secondary battery using the cathode active material of the present invention. A sheet (so-called film), folded, winding type cylinder with bottom or button shape etc., is selected for use depending upon the purpose.

EXAMPLES

Now, the present invention will be described in further detail with reference to Examples. However, the present invention is by no means restricted to such specific examples. Examples 1 to 3, 6, 7, 9, 10, 12 and 14 are examples of the present invention, and Examples 4, 5, 8, 11, 13 and 15 are comparative examples.

Example 1

An aqueous solution of a sulfate mixture containing nickel sulfate, cobalt sulfate and manganese sulfate, which was so prepared as to have an atomic ratio of nickel, cobalt and manganese of Ni:Co:Mn=1:1:1 an ammonium sulfate aqueous solution and a sodium hydroxide aqueous solution each were continuously supplied into a reaction vessel under stirring so that the pH of the slurry in the reaction vessel became 11.0 and the temperature became 50° C. The fluid volume in the reaction system was controlled by an overflow method and a co-precipitated slurry overflown was filtered, washed with water and then dried at 80° C. to obtain a nickel-cobalt-manganese composite hydroxide powder.

Then the composite hydroxide powder was dispersed in 6 weight % of an aqueous solution of sodium persulfate containing 3 weight % of sodium hydroxide and the mixture was stirred at 20° C. for 12 hours to synthesize a nickel-cobalt-manganese composite oxyhydroxide slurry. The composite oxyhydroxide slurry was filtered, washed with water and then dried to obtain a composite oxyhydroxide powder. The specific surface area of the composite oxyhydroxide powder was 9.6 m²/g and the average particle size was 10.1 µm.

A predetermined amount of a lithium carbonate powder with an average particle size of 20 µm was mixed in the composite oxyhydroxide powder thus obtained, and the mixture was fired at 1000° C. in an atmosphere with an oxygen concentration of 40 vol %, for 16 hours, followed by pulverizing to obtain a base material comprising a lithium-containing composite oxide with a composition of $Li_{1.02}(Ni_{1/3}Co_{1/3}Mn_{1/3})_{0.98}O_2$. With the base material, a powder X-ray diffraction spectrum was measured with CuKα radiation and it was found that the base material was a rhombohedral system (R-3m) analogue. The measurement was carried out with RINT 2100 model, manufactured by Rigaku Corporation. With particles of the base material powder, the SEM observation was carried out and it was found that the particles were secondary particles resulting from agglomeration of many primary particles and the shape was substantially spherical or elliptical.

Then, 48.73 g of water was added to 1.27 g of an aqueous solution of basic aluminum lactate with an aluminum content of 4.4 weight % to prepare an Al aqueous solution with pH 5. After 100 g of the base material was immersed in 50 g of the Al aqueous solution, they were mixed slowly to obtain a powder mixture. Furthermore, the powder mixture was dried at 120° C. for 4 hours to obtain aluminum complex-impregnated particles. The dried complex-impregnated particles were heated at 350° C. in an oxygen-containing atmosphere for 12 hours to obtain substantially spherical particles of a surface-modified lithium-containing composite oxide of the present invention having an average particle size of 10.3 µm, D10 of 5.1 µm, D90 of 14.1 µm and a specific surface area of 0.51 m²/g.

With the surface-modified lithium-containing composite oxide particles obtained, an X-ray diffraction spectrum was obtained with the X-ray diffraction apparatus (RINT 2100 model, manufactured by Rigaku Corporation). In the powder X-ray diffraction analysis using CuKα radiation, the half-value width of the diffraction peak of the (110) plane at 2θ=65.1±1° was 0.228°. The press density of the particles was 2.69 g/cm³. Aluminum contained in the surface-modified lithium-containing composite oxide particles was in the atomic ratio of 0.002 to a total of nickel, manganese and cobalt.

Furthermore, with the surface-modified lithium-containing composite oxide particles obtained, the atomic ratio (Al/NiM) of the composite oxide was measured by the XPS analysis, and found to be (Al/NiM)=1.37. In addition, the elution amount of lithium ions was 0.20 mol %.

The above surface-modified lithium-containing composite oxide particles, acetylene black and polyvinylidene fluoride powders were mixed in a weight ratio of 90/5/5 and N-methylpyrrolidone was added to form a slurry, which was applied onto one side of aluminum foil having a thickness of 20 µm, by a doctor blade. After drying, roll pressing was carried out three times to obtain a positive electrode sheet for a lithium battery.

Then, four simplified sealed cell type lithium batteries of stainless steel were assembled in an argon grove box, using a punched sheet from the positive electrode sheet as a positive electrode, a metal lithium foil having a thickness of 500 µm as a negative electrode, a nickel foil of 20 µm as a negative electrode current collector, a porous polypropylene having a thickness of 25 µm as a separator and a LiPF$_6$/EC+DEC(1:1) solution (which means a mixed solution of EC and DEC in a weight ratio (1:1) whose solute is LiPF$_6$; the same also applies to solvents as mentioned hereinafter) in a concentration of 1M as an electrolyte.

One battery out of the above four was charged up to 4.3 V at a load current of 30 mA per 1 g of the cathode active material at 25° C, and discharged down to 2.5 V at a load current of 30 mA per 1 g of the cathode active material, whereby an initial discharge capacity was obtained. Furthermore, with this battery, the charge and discharge cycle test was sequentially carried out 30 times. As a result, the initial weight capacity density of the cathode active material at from 2.5 to 4.3 V at 25° C was 159 mAh/g, and the capacity retention after 30 charge and discharge cycles was 98.8%. Furthermore, the same operation was carried out with another battery except that the charging voltage was changed from 4.3 V to 4.5 V and the charge and discharge cycle test was changed to 25 cycles, and as a result, the initial weight capacity density of the cathode active material at from 2.5 to 4.5 V was 173 mAh/g, and the capacity retention after 25 charge and discharge cycles was 97.5%.

Moreover, each of the other batteries was charged at 4.3 V or 4.5 V for 10 hours, and then disassembled in the argon grove box. The positive electrode sheet after charged was taken out, washed, punched into a diameter of 3 mm, and then sealed with EC in an aluminum capsule. Then, while the temperature was raised at a rate of 5° C/min by a scanning differential calorimeter, a heat generation starting temperature was measured. As a result, the heat generation starting temperature of a heat generation curve of the 4.3 V-charged product was 273° C and the heat generation starting temperature of the 4.5 V-charged product was 200° C.

Example 2

A lithium-containing composite oxide with a composition of Li$_{1.02}$(Ni$_{1/3}$Co$_{1/3}$Mn$_{1/3}$)$_{0.98}$O$_2$ as a base material was synthesized in the same manner as in Example 1.

Then, 43.64 g of water was added to 6.36 g of an aqueous solution of basic aluminum lactate with an aluminum content of 4.4 weight % to prepare an Al aqueous solution with pH 5. After 100 g of the base material was immersed in 50 g of the Al aqueous solution, they were mixed slowly to obtain a powder mixture. Furthermore, the powder mixture was dried at 120° C. for 4 hours to obtain aluminum complex-impregnated particles. The dried complex-impregnated particles were heated at 350° C. in an oxygen-containing atmosphere for 12 hours to obtain substantially spherical particles of a surface-modified lithium-containing composite oxide of the present invention having an average particle size of 10.5 µm, D10 of 5.5 µm, D90 of 14.9 µm and a specific surface area of 0.49 m$^2$/g.

With the surface-modified lithium-containing composite oxide particles obtained, an X-ray diffraction spectrum was measured in the same manner as in Example 1. In the powder X-ray diffraction analysis using CuKα radiation, the half-value width of the diffraction peak of the (110) plane at 2θ=65.1±1° was 0.226°. The press density of the particles was 2.65 g/cm$^3$. In addition, aluminum contained in the surface-modified lithium-containing composite oxide particles was at the atomic ratio of 0.01 to the total of nickel, manganese and cobalt.

Furthermore, with the surface-modified lithium-containing composite oxide particles obtained, the atomic ratio (Al/NiM) of the composite oxide was measured by the XPS analysis in the same manner as in Example 1 and found to be (Al/NiM)=3.25. In addition, the elution amount of lithium ions was 0.32 mol %.

It was found that a carbon compound having a carbon-oxygen double bond existed in the surface layer of the surface-modified lithium-containing composite oxide because there was a strong absorption peak in the range of from 1300 to 1700 cm$^{-1}$ in the chart of IR spectrum in FIG. 1 as described above.

Furthermore, it was found from FIG. 2 that the decomposition reaction of the aluminum lactate proceeded from 300 to 450° C. and the decomposition was almost finished at 500° C.

Still furthermore, it was found from the foregoing that the carbon compound existed in the surface layer of the surface-modified lithium-containing composite oxide particles synthesized by the heat treatment at 350° C. in Example 2. It was also found that the carbon compound was a partial pyrolysate of the carbon-containing aluminum complex used as a raw material.

Electrodes and batteries were prepared and evaluated in the same manner as in Example 1 except that the positive electrode sheet was one prepared using the above surface-modified lithium-containing composite oxide.

As a result, the initial weight capacity density of the cathode active material at from 2.5 to 4.3 V at 25° C. was 157 mAh/g, and the capacity retention after the 30 charge and discharge cycles was 98.8%.

On the other hand, the initial weight capacity density of the cathode active material at from 2.5 to 4.5 V at 25° C. was 172 mAh/g, and the capacity retention after the 25 charge and discharge cycles was 97.0%.

Furthermore, while the temperature was raised at a rate of 5° C./min by a scanning differential calorimeter, a heat generation starting temperature was measured, and as a result, the heat generation starting temperature of a heat generation curve of the 4.3 V-charged product was 237° C. and the heat generation starting temperature of the 4.5 V-charged product was 199° C.

Example 3

A lithium-containing composite oxide with a composition of Li$_{1.02}$(Ni$_{1/3}$Co$_{1/3}$Mn$_{1/3}$)$_{0.98}$O$_2$ as a base material was synthesized in the same manner as in Example 1.

Then, 37.29 g of water was added to 12.71 g of an aqueous solution of basic aluminum lactate with an aluminum content of 4.4 weight % to prepare an Al aqueous solution with pH 5.

After 100 g of the base material was immersed in 50 g of the Al aqueous solution, they were mixed slowly to obtain a powder mixture. Furthermore, the powder mixture was dried at 120° C. for 4 hours to obtain aluminum complex-impregnated particles. The dried complex-impregnated particles were heated at 350° C. in an oxygen-containing atmosphere for 12 hours to obtain substantially spherical particles of a surface-modified lithium-containing composite oxide of the present invention having an average particle size of 10.6 µm, D10 of 5.4 µm, D90 of 14.8 µm and a specific surface area of 0.48 m$^2$/g.

With the surface-modified lithium-containing composite oxide particles obtained, an X-ray diffraction spectrum was measured in the same manner as in Example 1. In the powder X-ray diffraction analysis using CuKα radiation, the half-value width of the diffraction peak of the (110) plane at 2θ=65.1±1° was 0.230°. The press density of the particles was 2.65 g/cm$^3$. In addition, aluminum contained in the surface-modified lithium-containing composite oxide particles was at the atomic ratio of 0.02 to the total of nickel, manganese and cobalt.

Furthermore, with the surface-modified lithium-containing composite oxide particles obtained, the atomic ratio (Al/NiM) of the composite oxide was measured by the XPS analysis in the same manner as in Example 1 and found to be (Al/NiM)=9.0. In addition, the elution amount of lithium ions was 0.50 mol %.

Electrodes and batteries were prepared and evaluated in the same manner as in Example 1 except that the positive electrode sheet was one prepared using the above surface-modified lithium-containing composite oxide.

As a result, the initial weight capacity density of the cathode active material at from 2.5 to 4.3 V at 25° C. was 157 mAh/g, and the capacity retention after the 30 charge and discharge cycles was 98.7%.

On the other hand, the initial weight capacity density of the cathode active material at from 2.5 to 4.5 V at 25° C. was 171 mAh/g, and the capacity retention after the 25 charge and discharge cycles was 97.2%.

Furthermore, the temperature was raised at a rate of 5° C./min by a scanning differential calorimeter, a heat generation starting temperature was measured, and as a result, the heat generation starting temperature of a heat generation curve of the 4.3 V-charged product was 239° C. and the heat generation starting temperature of the 4.5 V-charged product was 202° C.

Example 4

A lithium-containing composite oxide with a composition of Li$_{1.02}$(Ni$_{1/3}$Co$_{1/3}$Mn$_{1.3}$)$_{0.98}$O$_2$ as a base material was synthesized in the same manner as in Example 1. The base material had an average particle size of 10.5 µm, D10 of 5.3 µm, D90 of 13.5 µm and a specific surface area of 0.49 m$^2$/g, and was a powder composed of secondary particles resulting from agglomeration of many primary particles. With the composite oxide particles, an X-ray diffraction spectrum was obtained with the X-ray diffraction apparatus (RINT 2100 model, manufactured by Rigaku Corporation). In the powder X-ray diffraction analysis using CuKα radiation, the half-value width of the diffraction peak of the (110) plane near 2θ=65.1±1° was 0.225°. Furthermore, the press density was 2.70 g/cm$^3$.

With the above lithium-containing composite oxide particles as the base material, the surface element analysis using the XPS analysis was conducted in the same manner as in Example 1, and no aluminum was detected.

Moreover, it was found that the lithium-containing composite oxide contained no compound having a carbon-oxygen double bond because there is no strong absorption peak in the range of from 1300 to 1700 cm$^{-1}$ in the chart of IR spectrum in FIG. 1 as described above.

A positive electrode sheet was prepared using the above lithium-containing composite oxide as the base material, and batteries were assembled and evaluated in the same manner as in Example 1.

As a result, the initial weight capacity density of the cathode active material at from 2.5 to 4.3 V at 25° C. was 160 mAh/g, and the capacity retention after the 30 charge and discharge cycles was 95.0%.

On the other hand, the initial weight capacity density of the cathode active material at from 2.5 to 4.5 V at 25° C. was 175 mAh/g, and the capacity retention after the 25 charge and discharge cycles was 91.0%.

Furthermore, while the temperature was raised at a rate of 5° C./min by a scanning differential calorimeter, a heat generation starting temperature was measured, and as a result, the heat generation starting temperature of the 4.3 V-charged product was 232° C. and the heat generation starting temperature of the 4.5 V-charged product was 199° C.

Example 5

A lithium-containing composite oxide with a composition of Li$_{1.02}$(Ni$_{1/3}$Co$_{1/3}$Mn$_{1/3}$)$_{0.98}$O$_2$ as a base material was synthesized in the same manner as in Example 1.

Then, 49.87 g of water was added to 0.13 g of an aqueous solution of basic aluminum lactate with an aluminum content of 4.4 weight % to prepare an Al aqueous solution with pH 5. After 100 g of the base material was immersed in 50 g of the Al aqueous solution, they were mixed slowly to obtain a powder mixture. Furthermore, the powder mixture was dried at 120° C. for 4 hours to obtain aluminum complex-impregnated particles. The dried complex-impregnated particles were heated at 350° C. in an oxygen-containing atmosphere for 12 hours to obtain substantially spherical particles of a surface-modified lithium-containing composite oxide having an average particle size of 10.6 µm, D10 of 5.2 µm, D90 of 14.3 µm and a specific surface area of 0.48 m$^2$/g.

With the surface-modified lithium-containing composite oxide particles obtained, an X-ray diffraction spectrum was measured in the same manner as in Example 1. In the powder X-ray diffraction analysis using CuKα radiation, the half-value width of the diffraction peak of the (110) plane at 2θ=65.1±1° was 0.227°. The press density of the particles was 2.70 g/cm$^3$. In addition, aluminum contained in the surface-modified lithium-containing composite oxide particles was in the atomic ratio of 0.0002 to the total of nickel, manganese and cobalt.

Furthermore, with the surface-modified lithium-containing composite oxide particles obtained, the atomic ratio (Al/NiM) of the composite oxide was measured by the XPS analysis in the same manner as in Example 1 and found to be (Al/NiM)=0.16. In addition, the elution amount of lithium ions was 0.20 mol %.

Electrodes and batteries were prepared and evaluated in the same manner as in Example 1 except that the positive electrode sheet was one prepared using the above surface-modified lithium-containing composite oxide.

As a result, the initial weight capacity density of the cathode active material at from 2.5 to 4.3 V at 25° C. was 160 mAh/g, and the capacity retention after the 30 charge and discharge cycles was 95.3%.

On the other hand, the initial weight capacity density of the cathode active material at from 2.5 to 4.5 V at 25° C. was 174 mAh/g, and the capacity retention after the 25 charge and discharge cycles was 91.2%.

Furthermore, while the temperature was raised at a rate of 5° C./min by a scanning differential calorimeter, a heat generation starting temperature was measured, and as a result, the heat generation starting temperature of a heat generation curve of the 4.3 V-charged product was 236° C. and the heat generation starting temperature of the 4.5 V-charged product was 200° C.

Example 6

A lithium-containing composite oxide with a composition of $Li_{1.02}(Ni_{1/3}Co_{1/3}Mn_{1/3})_{0.98}O_2$ as a base material was synthesized in the same manner as in Example 1.

Then, 4.73 g of water was added to 1.27 g of an aqueous solution of basic aluminum lactate with an aluminum content of 4.4 weight % to prepare an Al aqueous solution with pH 5. While 6 g of the Al aqueous solution was sprayed over 100 g of the base material, they were mixed by using a drum mixer to obtain a powder mixture. Furthermore, the powder mixture was dried at 120° C. for 4 hours to obtain aluminum complex-added particles. The dried complex-added particles were heated at 350° C. in an oxygen-containing atmosphere for 12 hours to obtain substantially spherical particles of a surface-modified lithium-containing composite oxide having an average particle size of 10.4 μm, D10 of 5.0 μm, D90 of 14.5 μm and a specific surface area of 0.50 m²/g.

With the surface-modified lithium-containing composite oxide particles obtained, an X-ray diffraction spectrum was measured in the same manner as in Example 1. In the powder X-ray diffraction analysis using CuKα radiation, the half-value width of the diffraction peak of the (110) plane at 2θ=65.1±1° was 0.227°. The press density of the particles was 2.68 g/cm³. In addition, aluminum contained in the surface-modified lithium-containing composite oxide particles was in the atomic ratio of 0.002 to the total of nickel, manganese and cobalt.

Furthermore, with the surface-modified lithium-containing composite oxide particles obtained, the atomic ratio (Al/NiM) of the composite oxide was measured by the XPS analysis in the same manner as in Example 1 and found to be (Al/NiM)=1.4. In addition, the elution amount of lithium ions was 0.19 mol %.

Electrodes and batteries were prepared and evaluated in the same manner as in Example 1 except that the positive electrode sheet was one prepared using the above surface-modified lithium-containing composite oxide.

As a result, the initial weight capacity density of the cathode active material at from 2.5 to 4.3 V at 25° C. was 159 mAh/g, and the capacity retention after the 30 charge and discharge cycles was 99.0%.

On the other hand, the initial weight capacity density of the cathode active material at from 2.5 to 4.5 V at 25° C. was 174 mAh/g, and the capacity retention after the 25 charge and discharge cycles was 98.0%.

Furthermore, while the temperature was raised at a rate of 5° C./min by a scanning differential calorimeter, a heat generation starting temperature was measured, and as a result, the heat generation starting temperature of a heat generation curve of the 4.3 V-charged product was 238° C. and the heat generation starting temperature of the 4.5 V-charged product was 201° C.

Example 7

A lithium-containing composite oxide with a composition of $Li_{1.05}(Ni_{1/3}Co_{1/3}Mn_{1/3})_{0.95}O_2$ as a base material was synthesized by mixing a predetermined amount of a lithium carbonate powder in the composite oxyhydroxide powder obtained in Example 1, followed by firing and pulverizing in the same manner as in Example 1.

Then, 4.71 g of water was added to 1.29 g of an aqueous solution of basic aluminum lactate with an aluminum content of 4.4 weight % to prepare an Al aqueous solution with pH 5. While 6 g of the Al aqueous solution was sprayed over 100 g of the base material, they were mixed by using a drum mixer to obtain a powder mixture. Furthermore, the powder mixture was dried at 120° C. for 4 hours to obtain aluminum complex-added particles. The dried complex-added particles were heated at 350° C. in an oxygen-containing atmosphere for 12 hours to obtain substantially spherical particles of a surface-modified lithium-containing composite oxide having an average particle size of 10.9 μm, D10 of 6.0 μm, D90 of 15.3 μm and a specific surface area of 0.49 m²/g.

With the surface-modified lithium-containing composite oxide particles obtained, an X-ray diffraction spectrum was measured in the same manner as in Example 1. In the powder X-ray diffraction analysis using CuKα radiation, the half-value width of the diffraction peak of the (110) plane at 2θ=65.1±1° was 0.198°. The press density of the particles was 2.69 g/cm³. In addition, aluminum contained in the surface-modified lithium-containing composite oxide particles was in the atomic ratio of 0.002 to the total of nickel, manganese and cobalt.

Furthermore, with the surface-modified lithium-containing composite oxide particles obtained, the atomic ratio (Al/NiM) of the composite oxide was measured by the XPS analysis in the same manner as in Example 1 and found to be (Al/NiM)=1.39. In addition, the elution amount of lithium ions was 0.29 mol %.

Electrodes and batteries were prepared and evaluated in the same manner as in Example 1 except that the positive electrode sheet was one prepared using the above surface-modified lithium-containing composite oxide.

As a result, the initial weight capacity density of the cathode active material at from 2.5 to 4.3 V at 25° C. was 157 mAh/g, and the capacity retention after the 30 charge and discharge cycles was 98.7%.

On the other hand, the initial weight capacity density of the cathode active material at from 2.5 to 4.5 V at 25° C. was 172 mAh/g, and the capacity retention after the 25 charge and discharge cycles was 96.0%.

Furthermore, while the temperature was raised at a rate of 5° C./min by a scanning differential calorimeter, a heat generation starting temperature was measured, and as a result, the heat generation starting temperature of a heat generation curve of the 4.3 V-charged product was 235° C. and the heat generation starting temperature of the 4.5 V-charged product was 201° C.

Example 8

A lithium-containing composite oxide with a composition of $Li_{1.05}(Ni_{1/3}Co_{1/3}Mn_{1/3})_{0.95}O_2$ as a base material was synthesized in the same manner as in Example 7. The base material had an average particle size of 10.8 μm, D10 of 6.1

μm, D90 of 15.1 μm and a specific surface area of 0.47 m$^2$/g, and was a powder composed of secondary particles resulting from agglomeration of many primary particles. With the composite oxide particles, an X-ray diffraction spectrum was obtained with the X-ray diffraction apparatus (RINT 2100 model, manufactured by Rigaku Corporation). In the powder X-ray diffraction analysis using CuKα radiation, the half-value width of the diffraction peak of the (110) plane near 2θ=65.1±1° was 0.199°. Furthermore, the press density was 2.70 g/cm$^3$.

With the above lithium-containing composite oxide particles as the base material, the surface element analysis using the XPS analysis was conducted in the same manner as in Example 1, and no aluminum was detected.

A positive electrode sheet was prepared using the above lithium-containing composite oxide particles as the base material, and batteries were assembled and evaluated in the same manner as in Example 1.

As a result, the initial weight capacity density of the cathode active material at from 2.5 to 4.3 V at 25° C. was 159 mAh/g, and the capacity retention after the 30 charge and discharge cycles was 94.9%.

On the other hand, the initial weight capacity density of the cathode active material at from 2.5 to 4.5 V at 25° C. was 174 mAh/g, and the capacity retention after the 25 charge and discharge cycles was 90.0%.

Furthermore, while the temperature was raised at a rate of 5° C./min by a scanning differential calorimeter, a heat generation starting temperature was measured, and as a result, the heat generation starting temperature of a heat generation curve of the 4.3 V-charged product was 230° C. and the heat generation starting temperature of the 4.5 V-charged product was 198° C.

Example 9

A lithium-containing composite oxide with a composition of $Li_{1.02}(Ni_{1/3}Co_{1/3}Mn_{1/3})_{0.98}O_2$ as a base material was synthesized in the same manner as in Example 1.

Then, 7.37 kg of water was added to 0.13 kg of an aqueous solution of basic aluminum lactate with an aluminum content of 4.4 weight % to prepare an Al aqueous solution with pH 5. 10 kg of the base material was filled in a Redige mixer and heated to 80° C. under mixing, and while 7.5 kg of the Al aqueous solution was sprayed, they were mixed and dried to obtain aluminum complex-added particles. The complex-added particles were heated at 350° C. in an oxygen-containing atmosphere for 12 hours to obtain substantially spherical particles of a surface-modified lithium-containing composite oxide having an average particle size of 10.0 μm, D10 of 4.8 μm, D90 of 14.0 μm and a specific surface area of 0.52 m$^2$/g.

With the surface-modified lithium-containing composite oxide particles obtained, an X-ray diffraction spectrum was measured in the same manner as in Example 1. In the powder X-ray diffraction analysis using CuKα radiation, the half-value width of the diffraction peak of the (110) plane at 2θ=65.1±1° was 0.227°. The press density of the particles was 2.66 g/cm$^3$. Aluminum contained in the surface-modified lithium-containing composite oxide particles was in the atomic ratio of 0.002 to the total of nickel, manganese and cobalt.

Furthermore, with the surface-modified lithium-containing composite oxide particles obtained, the atomic ratio (Al/NiM) of the composite oxide was measured by the XPS analysis in the same manner as in Example 1 and found to be (Al/NiM)=0.81. In addition, the elution amount of lithium ions was 0.31 mol %.

Electrodes and batteries were prepared and evaluated in the same manner as in Example 1 except that the positive electrode sheet was one prepared using the above surface-modified lithium-containing composite oxide.

As a result, the initial weight capacity density of the cathode active material at from 2.5 to 4.3 V at 25° C. was 160 mAh/g, and the capacity retention after the 30 charge and discharge cycles was 97.8%.

On the other hand, the initial weight capacity density of the cathode active material at from 2.5 to 4.5 V at 25° C. was 174 mAh/g, and the capacity retention after the 25 charge and discharge cycles was 96.0%.

Furthermore, while the temperature was raised at a rate of 5° C./min by a scanning differential calorimeter, a heat generation starting temperature was measured, and as a result, the heat generation starting temperature of a heat generation curve of the 4.3 V-charged product was 236° C. and the heat generation starting temperature of the 4.5 V-charged product was 200° C.

Example 10

Predetermined amounts of a lithium carbonate powder having an average particle size of 20 μm and zirconium oxide were mixed with the composite oxyhydroxide powder obtained in the same manner as in Example 1, and the mixture was fired at 1000° C. in an atmosphere with an oxygen content of 40 vol %, for 16 hours, followed by pulverizing to obtain a lithium-containing composite oxide with a composition of $Li_{1.02}[(Ni_{1/3}Co_{1/3}Mn_{1/3})_{0.999}Zr_{0.001}]_{0.98}O_2$ as a base material.

Then, 48.73 g of water was added to 1.27 g of an aqueous solution of basic aluminum lactate with an aluminum content of 4.4 weight % to prepare an Al aqueous solution with pH 5. After 100 g of the base material was immersed in 50 g of the Al aqueous solution, they were mixed slowly to obtain a powder mixture. Furthermore, the powder mixture was dried at 120° C. for 4 hours to obtain aluminum complex-impregnated particles. The dried complex-impregnated particles were heated at 350° C. in an oxygen-containing atmosphere for 12 hours to obtain substantially spherical particles of a surface-modified lithium-containing composite oxide having an average particle size of 10.3 μm, D10 of 5.3 μm, D90 of 14.7 μm and a specific surface area of 0.52 m$^2$/g.

With the surface-modified lithium-containing composite oxide particles obtained, an X-ray diffraction spectrum was measured in the same manner as in Example 1. In the powder X-ray diffraction analysis using CuKa radiation, the half-value width of the diffraction peak of the (110) plane at 2θ=65.1±1° was 0.229°. The press density of the particles was 2.66 g/cm$^3$. In addition, aluminum contained in the surface-modified lithium-containing composite oxide particles was in the atomic ratio of 0.002 to the total of nickel, manganese and cobalt.

Furthermore, with the surface-modified lithium-containing composite oxide particles obtained, the atomic ratio (Al/NiM) of the composite oxide was measured by the XPS analysis in the same manner as in Example 1 and found to be (Al/NiM)=1.35. In addition, the elution amount of lithium ions was 0.25 mol %.

Electrodes and batteries were prepared and evaluated in the same manner as in Example 1 except that the positive electrode sheet was one prepared using the above surface-modified lithium-containing composite oxide.

As a result, the initial weight capacity density of the cathode active material at from 2.5 to 4.3 V at 25° C. was 157 mAh/g, and the capacity retention after the 30 charge and discharge cycles was 99.3%.

On the other hand, the initial weight capacity density of the cathode active material at from 2.5 to 4.5 V at 25° C. was 171 mAh/g, and the capacity retention after the 25 charge and discharge cycles was 98.0%.

Furthermore, while the temperature was raised at a rate of 5° C./min by a scanning differential calorimeter, a heat generation starting temperature was measured, and as a result, the heat generation starting temperature of a heat generation curve of the 4.3 V-charged product was 241° C. and the heat generation starting temperature of the 4.5 V-charged product was 210° C.

Example 11

A lithium-containing composite oxide with a composition of $Li_{1.02}[(Ni_{1/3}Co_{1/3}Mn_{1/3})_{0.999}Zr_{0.001}]_{0.9802}$ was obtained in the same manner as in Example 10.

The lithium-containing composite oxide particles had an average particle size of 10.4 μm, D10 of 5.2 μm, D90 of 14.8 μm and a specific surface area of 0.49 m$^2$/g, and were a powder composed of secondary particles resulting from agglomeration of many primary particles. With the composite oxide particles, an X-ray diffraction spectrum was obtained with the X-ray diffraction apparatus (RINT 2100 model, manufactured by Rigaku Corporation). In the powder X-ray diffraction analysis using CuKα radiation, the half-value width of the diffraction peak of the (110) plane near 2θ=65.1±1° was 0.228°. Furthermore, the press density was 2.67 g/cm$^3$.

With the above lithium-containing composite oxide particles, the surface element analysis using the XPS analysis was conducted in the same manner as in Example 1, and no aluminum was detected.

Electrodes and batteries were prepared and evaluated in the same manner as in Example 1 except that the positive electrode sheet was one prepared using the above lithium-containing composite oxide.

As a result, the initial weight capacity density of the cathode active material at from 2.5 to 4.3 V at 25° C. was 157 mAh/g, and the capacity retention after the 30 times of charge and discharge cycle was 98.0%.

On the other hand, the initial weight capacity density of the cathode active material at from 2.5 to 4.5 V at 25° C. was 172 mAh/g, and the capacity retention after the 25 charge and discharge cycles was 97.5%.

Furthermore, while the temperature was raised at a rate of 5° C./min by a scanning differential calorimeter, a heat generation starting temperature was measured, and as a result, the heat generation starting temperature of a heat generation curve of the 4.3 V-charged product was 239° C. and the heat generation starting temperature of the 4.5 V-charged product was 208° C.

Example 12

An aqueous solution of a sulfate mixture containing nickel sulfate, cobalt sulfate and manganese sulfate, which was so prepared as to have an atomic ratio of nickel, cobalt and manganese of Ni:Co:Mn=0.35:0.40:0.25, an ammonium sulfate aqueous solution and a sodium hydroxide aqueous solution each were continuously supplied into a reaction vessel under stirring so that the pH of the slurry in the reaction vessel became 11.0 and the temperature became 50° C. The fluid volume in the reaction system was controlled by an overflow method and a co-precipitated slurry overflown was filtered, washed with water and then dried at 80° C. to obtain a nickel-cobalt-manganese composite hydroxide powder.

Then the composite hydroxide powder was dispersed in 6 weight % of an aqueous solution of sodium persulfate containing 3 weight % of sodium hydroxide and the mixture was stirred at 20° C. for 12 hours to synthesize a nickel-cobalt-manganese composite oxyhydroxide slurry. The composite oxyhydroxide slurry was filtered, washed with water and then dried to obtain a composite oxyhydroxide powder. The specific surface area of the composite oxyhydroxide powder was 9.4 m$^2$/g and the average particle size was 10.0 μm.

A predetermined amount of a lithium carbonate powder with an average particle size of 20 μm was mixed with the composite oxyhydroxide powder thus obtained, and the mixture was fired at 990° C. in an oxygen-containing atmosphere, for 16 hours, followed by pulverizing to obtain a base material composed of a lithium-containing composite oxide with a composition of $Li_{1.02}(Ni_{0.35}Co_{0.40}Mn_{0.25})_{0.98}O_2$. With the base material, a powder X-ray diffraction spectrum was measured with CuKα radiation and it was found that the base material was a rhombohedral system (R-3m) analogue. The measurement was carried out with RINT 2100 model, manufactured by Rigaku Corporation. With particles of the base material powder, the SEM observation was carried out and it was found that the particles were secondary particles resulting from agglomeration of many primary particles and the shape was substantially spherical or elliptical.

Then, 4.73 g of water was added to 1.27 g of an aqueous solution of basic aluminum lactate with an aluminum content of 4.4 weight % to prepare an Al aqueous solution with pH 5. While 6 g of the Al aqueous solution was sprayed over 100 g of the base material, they were mixed by using a drum mixer to obtain a powder mixture. Furthermore, the powder mixture was dried at 120° C. for 4 hours to obtain aluminum complex-added particles. The dried complex-added particles were heated at 350° C. in an oxygen-containing atmosphere for 12 hours to obtain substantially spherical particles of a surface-modified lithium-containing composite oxide having an average particle size of 10.1 μm, D10 of 5.1 μm, D90 of 14.2 μm and a specific surface area of 0.45 m$^2$/g.

With the surface-modified lithium-containing composite oxide particles obtained, an X-ray diffraction spectrum was measured in the same manner as in Example 1. In the powder X-ray diffraction analysis using CuKα radiation, the half-value width of the diffraction peak of the (110) plane at 2θ=65.1±1° was 0.22°. The press density of the particles was 2.73 g/cm$^3$. In addition, aluminum contained in the surface-modified lithium-containing composite oxide particles was in the atomic ratio of 0.002 to the total of nickel, manganese and cobalt.

Furthermore, with the surface-modified lithium-containing composite oxide particles obtained, the atomic ratio (Al/NiM) of the composite oxide was measured by the XPS analysis in the same manner as in Example 1 and found to be (Al/NiM)=1.39.

Electrodes and batteries were prepared and evaluated in the same manner as in Example 1 except that the positive electrode sheet was one prepared using the above surface-modified lithium-containing composite oxide.

As a result, the initial weight capacity density of the cathode active material at from 2.5 to 4.3 V at 25° C. was 159 mAh/g, and the capacity retention after the 30 charge and discharge cycles was 99.0%.

Example 13

A lithium-containing composite oxide with a composition of $Li_{1.02}(Ni_{0.35}Co_{0.40}Mn_{0.25})_{0.98}O_2$ as a base material was synthesized in the same manner as in Example 12. The base material had an average particle size of 9.9 μm, D10 of 4.9 μm, D90 of 13.9 μm and a specific surface area of 0.4 m$^2$/g, and was a powder composed of secondary particles resulting from agglomeration of many primary particles. With the composite oxide particles, an X-ray diffraction spectrum was obtained with the X-ray diffraction apparatus (RINT 2100 model, manufactured by Rigaku Corporation). In the powder X-ray diffraction analysis using CuKα radiation, the half-value width of the diffraction peak of the (110) plane near 2θ=65.1±1° was 0.22°. Furthermore, the press density was 2.75 g/cm$^3$.

With the above lithium-containing composite oxide particles as the base material, the surface element analysis using the XPS analysis was conducted in the same manner as in Example 1, and no aluminum was detected.

A positive electrode sheet was prepared using the above lithium-containing composite oxide as the base material, and batteries were assembled and evaluated in the same manner as in Example 1.

As a result, the initial weight capacity density of the cathode active material at from 2.5 to 4.3 V at 25° C. was 161 mAh/g, and the capacity retention after the 30 charge and discharge cycles was 96.0%.

Example 14

An aqueous solution of a sulfate mixture containing nickel sulfate, cobalt sulfate and manganese sulfate, which was so prepared as to have an atomic ratio of nickel, cobalt and manganese of Ni:Co:Mn=0.50:0.20:0.30, an ammonium sulfate aqueous solution and a sodium hydroxide aqueous solution each were continuously supplied into a reaction vessel under stirring so that the pH of the slurry in the reaction vessel became 11.0 and the temperature became 50° C. The fluid volume in the reaction system was controlled by an overflow method and a co-precipitated slurry overflown was filtered, washed with water and then dried at 80° C. to obtain a nickel-cobalt-manganese composite hydroxide powder.

Then the composite hydroxide powder was dispersed in 6 weight % of an aqueous solution of sodium persulfate containing 3 weight % of sodium hydroxide and the mixture was stirred at 20° C. for 12 hours to synthesize a nickel-cobalt-manganese composite oxyhydroxide slurry. The composite oxyhydroxide slurry was filtered, washed with water and then dried to obtain a composite oxyhydroxide powder. The specific surface area of the composite oxyhydroxide powder was 10.3 m$^2$/g and the average particle size was 10.9 μm.

A predetermined amount of a lithium carbonate powder with an average particle size of 20 μm was mixed in the composite oxyhydroxide powder thus obtained and fired at 950° C. in an oxygen-containing atmosphere, for 12 hours, followed by pulverizing to obtain a base material composed of a lithium-containing composite oxide with a composition of $Li_{1.01}(Ni_{0.50}Co_{0.20}Mn_{0.30})_{0.99}O_2$. With the base material, a powder X-ray diffraction spectrum was measured with CuKα radiation and it was found that the base material was a rhombohedral system (R-3m) analogue. The measurement was carried out with RINT 2100 model, manufactured by Rigaku Corporation. With particles of the base material powder, the SEM observation was carried out and it was found that the particles were secondary particles resulting from agglomeration of many primary particles and the shape was substantially spherical or elliptical.

Then, 4.73 g of water was added to 1.27 g of an aqueous solution of basic aluminum lactate with an aluminum content of 4.4 weight % to prepare an Al aqueous solution with pH 5. While 6 g of the Al aqueous solution was sprayed over 100 g of the base material, they were mixed by using a drum mixer to obtain a powder mixture. Furthermore, the powder mixture was dried at 120° C. for 4 hours to obtain aluminum complex-added particles. The dried complex-added particles were heated at 350° C. in an oxygen-containing atmosphere for 12 hours to obtain substantially spherical particles of a surface-modified lithium-containing composite oxide having an average particle size of 11.0 μm, D10 of 5.7 μm, D90 of 16.4 μm and a specific surface area of 0.49 m$^2$/g.

With the surface-modified lithium-containing composite oxide particles obtained, an X-ray diffraction spectrum was measured in the same manner as in Example 1. In the powder X-ray diffraction analysis using CuKα radiation, the half-value width of the diffraction peak of the (110) plane at 2θ=65.1±1° was 0.111°. The press density of the particles was 2.78 g/cm$^3$. In addition, aluminum contained in the surface-modified lithium-containing composite oxide particles was at the atomic ratio of 0.002 to the total of nickel, manganese and cobalt.

Furthermore, with the surface-modified lithium-containing composite oxide particles obtained, the atomic ratio (Al/NiM) of the composite oxide was measured by the XPS analysis in the same manner as in Example 1 and found to be (Al/NiM)=1.38.

Electrodes and batteries were prepared and evaluated in the same manner as in Example 1 except that the positive electrode sheet was one prepared using the above surface-modified lithium-containing composite oxide.

As a result, the initial weight capacity density of the cathode active material at from 2.5 to 4.3 V at 25° C. was 165 mAh/g, and the capacity retention after the 30 charge and discharge cycles was 96.1%.

Example 15

A lithium-containing composite oxide with a composition of $Li_{1.01}(Ni_{0.50}Co_{0.20}Mn_{0.30})_{0.99}O_2$ as a base material was synthesized in the same manner as in Example 14. The lithium-containing composite oxide had an average particle size of 10.5 μm, D10 of 5.1 μm, D90 of 15.9 μm and a specific surface area of 0.41 m$^2$/g, and was a powder composed of secondary particles resulting from agglomeration of many primary particles. With the composite oxide particles, an X-ray diffraction spectrum was obtained with the X-ray diffraction apparatus (RINT 2100 model, manufactured by Rigaku Corporation). In the powder X-ray diffraction analysis using CuKα radiation, the half-value width of the diffraction peak of the (110) plane near 2θ=65.1±1° was 0.11°. Furthermore, the press density was 2.8 g/cm$^3$.

With the above lithium-containing composite oxide particles as the base material, the surface element analysis using the XPS analysis was conducted in the same manner as in Example 1, and no aluminum was detected.

A positive electrode sheet was prepared using the above lithium-containing composite oxide as the base material, and batteries were assembled and evaluated in the same manner as in Example 1.

As a result, the initial weight capacity density of the cathode active material at from 2.5 to 4.3 V at 25° C. was 169 mAh/g, and the capacity retention after the 30 charge and discharge cycles was 94.0%.

INDUSTRIAL APPLICABILITY

The present invention provides a cathode active material for a non-aqueous electrolyte secondary battery comprising a lithium-containing composite oxide particle with a high operating voltage, a high discharge capacity and excellent cyclic charge and discharge properties, without reduction in safety, a process for producing the cathode active material and a non-aqueous electrolyte secondary battery utilizing the cathode active material.

The entire disclosure of Japanese Patent Application No. 2006-161390 filed on Jun. 9, 2006 including the specification, claims, drawings and summary is incorporated herein by reference in its entirety.

What is claimed is:

1. A process for producing a cathode active material for a non-aqueous electrolyte secondary battery, comprising:
   preparing an aluminum complex-containing aqueous solution of aluminum and a carbon compound that forms a water-soluble complex with aluminum;
   impregnating the aluminum carbon compound complex-containing aqueous solution at a pH of from 3 to 12 into a lithium-containing composite oxide particle of formula:

$Li_pN_xO_2$ wherein
   $N=Ni_yM_{1-y-z}L_z$,
   M is at least one element selected from Co and Mn,
   L is an element selected from alkaline earth metal elements, aluminum and transition metal elements other than Ni, Co and Mn,
   $0.9 \leq p \leq 1.1$, $0.9 \leq x < 1.1$, $0.2 \leq y \leq 0.9$, and $0 \leq z \leq 0.3$, to obtain a moist aluminum carbon compound complex-impregnated particle;
   mixing and drying the moist aluminum carbon compound complex-impregnated particle, and
   subjecting the dried aluminum carbon compound complex-impregnated particle to a heat treatment in an oxygen-containing atmosphere to obtain a surface-modified lithium-containing composite oxide particle
   wherein
   a layer from the surface of the surface-modified lithium-containing composite oxide particle to a depth of 5 nm comprises aluminum, and
   an atomic ratio of the aluminum to a total of Ni and the element M in the layer of 5 nm depth from the surface is at least 0.8.

2. The process for producing a cathode active material for a non-aqueous electrolyte secondary battery according to claim 1,
   wherein
   the lithium-containing composite oxide particle of formula:

$Li_pN_xO_2$ is a particle of at least one member selected from the group consisting of lithium nickel cobalt oxide, lithium nickel manganese oxide and lithium nickel cobalt manganese oxide, and
   wherein an atomic ratio of aluminum to the elements represented by N in the surface-modified lithium-containing composite oxide whole particle is from 0.0005 to 0.20.

3. The process for producing a cathode active material for a non-aqueous electrolyte secondary battery according to claim 1, wherein an average particle size (D50) of the surface-modified lithium-containing composite oxide particle is from 5 to 25 μm.

4. The process for producing a cathode active material for a non-aqueous electrolyte secondary battery according to claim 1, wherein the surface-modified lithium-containing composite oxide particle comprises a carbon compound in the layer of 5 nm depth from the surface of the composite oxide particle.

5. The process for producing a cathode active material for a non-aqueous electrolyte secondary battery according to claim 4, wherein the carbon compound is a partial pyrolysate of the aluminum carbon compound complex.

6. A lithium secondary battery comprising a positive electrode, a negative electrode and a non-aqueous electrolyte, wherein the cathode active material comprises the cathode active material obtained according to the process of claim 1.

7. The process for producing a cathode active material for a non-aqueous electrolyte secondary battery according to claim 1, wherein a temperature of the heat treatment is from 200 to 450° C.

8. The process for producing a cathode active material for a non-aqueous electrolyte secondary battery according to claim 1, wherein the carbon-containing aluminum complex is basic aluminum lactate.

9. The process for producing a cathode active material for a non-aqueous electrolyte secondary battery according to claim 1, wherein at least one of the impregnating and, mixing and drying takes place in a drum mixer.

10. The process for producing a cathode active material for a non-aqueous electrolyte secondary battery according to claim 1, wherein a structure of the carbon compound that forms a water-soluble complex with aluminum comprises a carbon-oxygen double bond.

11. The process for producing a cathode active material for a non-aqueous electrolyte secondary battery according to claim 10, wherein the carbon-oxygen double bond is of a carbonate group or a carbonyl group.

12. A cathode for a lithium secondary battery, comprising:
    a current collector, and
    the cathode active material obtained according to the process of claim 1.

* * * * *